US012626155B2

(12) United States Patent
Feng et al.

(10) Patent No.:　US 12,626,155 B2
(45) Date of Patent:　May 12, 2026

(54) MACHINE LEARNING MODEL FOR ENTITY RESOLUTION

(71) Applicant: Capital One Services, LLC, McLean, VA (US)

(72) Inventors: Fan Feng, New York, NY (US); Allison Fenichel, Brooklyn, NY (US); Illiana Reed, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 1334 days.

(21) Appl. No.: 17/172,863

(22) Filed: Feb. 10, 2021

(65) Prior Publication Data

US 2022/0253725 A1　　Aug. 11, 2022

(51) Int. Cl.
*G06N 5/04*　　　(2023.01)
*G06N 20/00*　　　(2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS 10,983,983 B2 * 4/2021 Kallas ................. G06F 16/2365
2019/0311229 A1 * 10/2019 Qian ........................ G06F 18/41

2020/0394511 A1 * 12/2020 Kasai ..................... G06N 3/044
2021/0081848 A1 * 3/2021 Polleri ................ G06F 11/3409
2021/0287069 A1 * 9/2021 Mumcuyan ....... G06F 16/90344
2023/0336340 A1 * 10/2023 Polleri ................ G06F 18/2193
2023/0418825 A1 * 12/2023 Berkner .............. G06F 16/9017

OTHER PUBLICATIONS

Hou, Boyi, et al. "Gradual machine learning for entity resolution." The World Wide Web Conference. 2019. https://dl.acm.org/doi/pdf/10.1145/3308558.3314121 (Year: 2019).*

Yadav, Sanjay, and Sanyam Shukla. "Analysis of k-fold cross-validation over hold-out validation on colossal datasets for quality classification." 2016 IEEE 6th International conference on advanced computing (IACC). IEEE, 2016. https://ieeexplore.ieee.org/stamp/stamp.jsp?tp=&arnumber=7544814 (Year: 2016).*

Yakovlev, Anatoly, et al. "Oracle automl: a fast and predictive automl pipeline." Proceedings of the VLDB Endowment 13.12 (2020): 3166-3180. https://dl.acm.org/doi/pdf/10.14778/3415478.3415542 (Year: 2020).*

* cited by examiner

*Primary Examiner* — Michael H Hoang
(74) *Attorney, Agent, or Firm* — Harrity & Harrity, LLP

(57) ABSTRACT

In some implementations, a system may define common attributes of a first dataset and a second dataset. The system may generate a candidate set of mappings between one or more entities in the first dataset and one or more entities in the second dataset based on candidate generation criteria associated with a related pair of common attributes. The system may generate feature sets for the candidate set of mappings based on the common attributes and a featurization configuration. The system may train a machine learning model for performing entity resolution between the first dataset and the second dataset. The system may perform entity resolution between the first dataset and the second dataset based on the feature sets for the candidate set of mappings using the trained machine learning model.

20 Claims, 10 Drawing Sheets

Figure 1A:
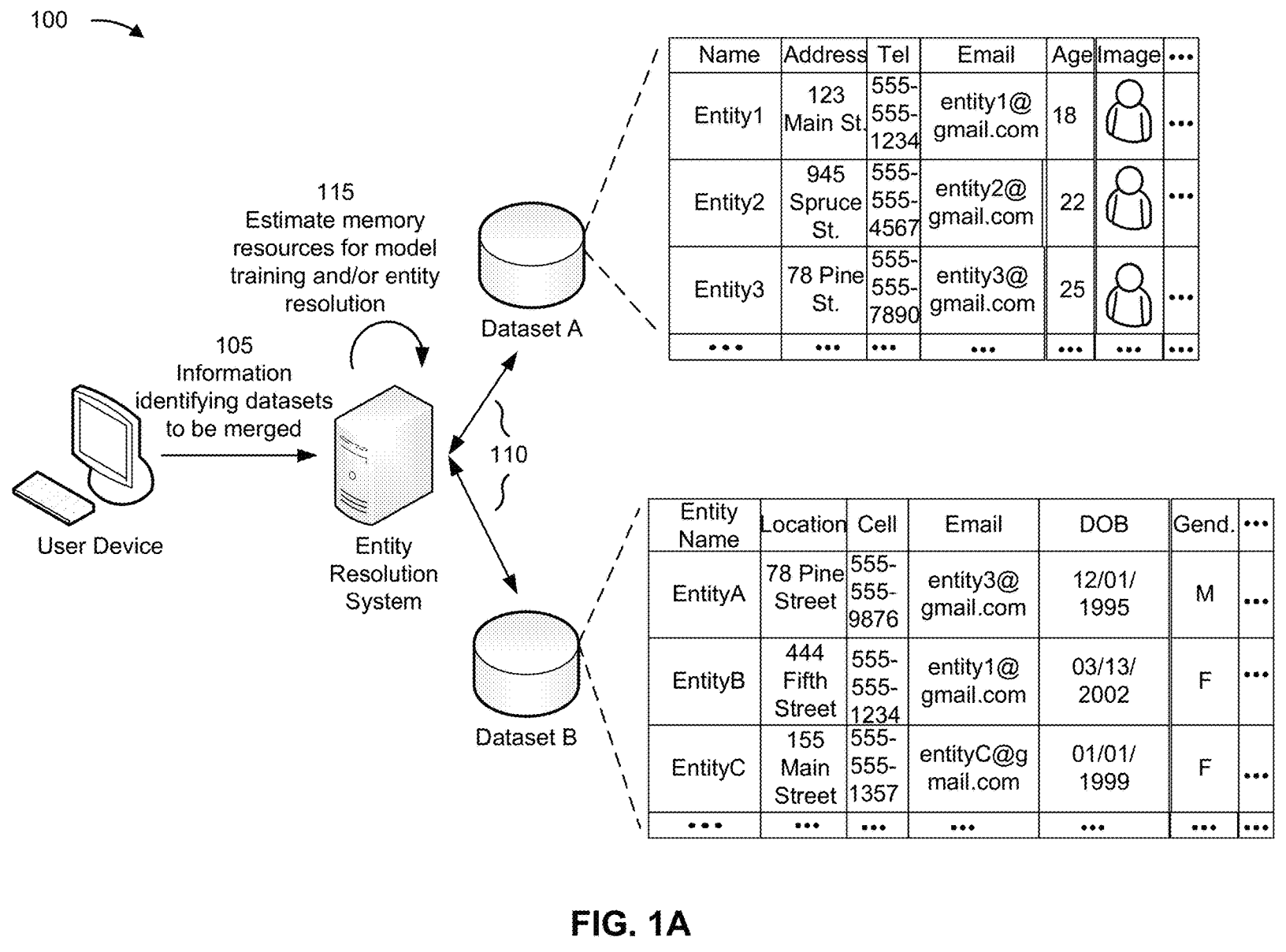

| Name | Address | Tel | Email | Age | Image | ... |
|------|---------|-----|-------|-----|-------|-----|
| Entity1 | 123 Main St. | 555-555-1234 | entity1@gmail.com | 18 | | ... |
| Entity2 | 945 Spruce St. | 555-555-4567 | entity2@gmail.com | 22 | | ... |
| Entity3 | 78 Pine St. | 555-555-7890 | entity3@gmail.com | 25 | | ... |
| ... | ... | ... | ... | ... | ... | ... |

Dataset A

| Entity Name | Location | Cell | Email | DOB | Gend. | ... |
|-------------|----------|------|-------|-----|-------|-----|
| EntityA | 78 Pine Street | 555-555-9876 | entity3@gmail.com | 12/01/1995 | M | ... |
| EntityB | 444 Fifth Street | 555-555-1234 | entity1@gmail.com | 03/13/2002 | F | ... |
| EntityC | 155 Main Street | 555-555-1357 | entityC@gmail.com | 01/01/1999 | F | ... |
| ... | ... | ... | ... | ... | ... | ... |

Dataset B

110

115
Estimate memory resources for model training and/or entity resolution

105
Information identifying datasets to be merged

Entity Resolution System

User Device

140
Generate feature sets for
candidate set    150
Select model(s) for
entity resolution
OR
155
Train model for entity
resolution Model
Training
System Entity
Resolution
System 135
Feature configuration 145
Model configuration
information User Device

100

175

Perform entity resolution using
trained or selected model(s)

185

Merged
Dataset

Entity
Resolution
System

180

Entity resolution results

User Device

| Name | Address | Tel | Email | Age | Image | DOB | Gender | ⋮ |
|------|---------|-----|-------|-----|-------|-----|--------|---|
| Entity1/B | 123 Main St. | 555-555-1234 | entity1@gmail.com | 18 | | 03/13/2002 | F | ⋮ |
| Entity2 | 945 Spruce St. | 555-555-4567 | entity2@gmail.com | 22 | | - | - | ⋮ |
| Entity3/A | 78 Pine St. | 555-555-7890 | entity3@gmail.com | 25 | | 12/01/1995 | M | ⋮ |
| EntityC | 555 Main St. | 555-555-1357 | entityC@gmail.com | - | | 01/01/1999 | F | ⋮ |
| ⋮ | ⋮ | ⋮ | ⋮ | ⋮ | | ⋮ | ⋮ | ⋮ |

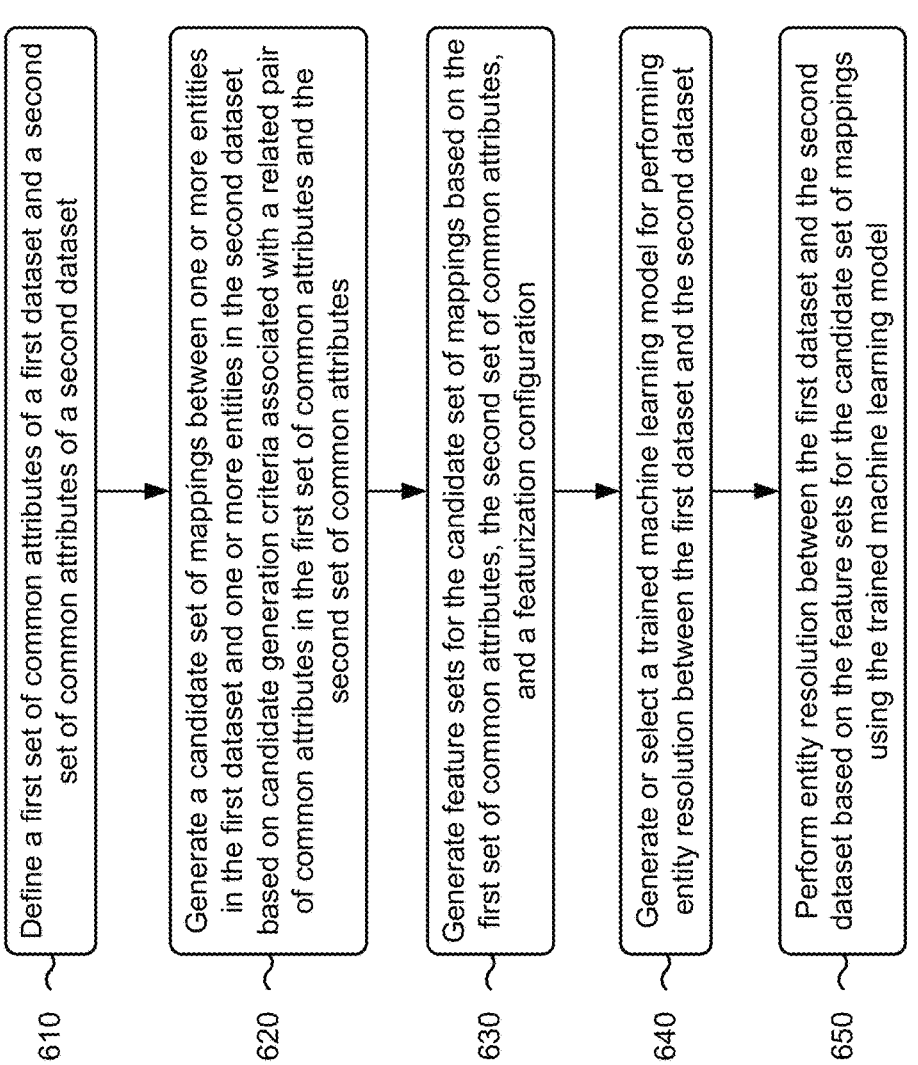

610  Define a first set of common attributes of a first dataset and a second set of common attributes of a second dataset 620  Generate a candidate set of mappings between one or more entities in the first dataset and one or more entities in the second dataset based on candidate generation criteria associated with a related pair of common attributes in the first set of common attributes and the second set of common attributes 630  Generate feature sets for the candidate set of mappings based on the first set of common attributes, the second set of common attributes, and a featurization configuration 640  Generate or select a trained machine learning model for performing entity resolution between the first dataset and the second dataset 650  Perform entity resolution between the first dataset and the second dataset based on the feature sets for the candidate set of mappings using the trained machine learning model

MACHINE LEARNING MODEL FOR ENTITY RESOLUTION

BACKGROUND

Entity resolution tasks involve disambiguating records that correspond to manifestations of real world entities across different datasets or within the same dataset. Entity resolution tasks may include eliminating duplicate copies of repeated data, clustering or grouping records that correspond to the same entity, identifying records that reference the same entity across different datasets, and/or converting data that represents entities with multiple representations into a standard form, among other examples.

SUMMARY

In some implementations, a system for generating a trained machine learning model for performing entity resolution includes one or more memories and one or more processors, communicatively coupled to the one or more memories, configured to: receive, from a client device, information identifying a first dataset and a second dataset; define a first set of common attributes of the first dataset and a second set of common attributes of the second dataset; define candidate generation criteria relating to at least one pair of related common attributes from the first set of common attributes and the second set of common attributes; generate a candidate set of mappings between one or more entities in the first dataset and one or more entities in the second dataset based on the candidate generation criteria; determine a featurization configuration for the first set of common attributes and the second set of common attributes; generate feature sets for the candidate set of mappings based on the first set of common attributes, the second set of common attributes, and the featurization configuration and the candidate set; receive, from the client device, model configuration information; train a machine learning model for performing entity resolution between the first dataset and the second dataset based on the model configuration information, resulting in a trained machine learning model; and perform entity resolution between the first dataset and the second dataset based on the feature sets for the candidate set of mappings using the trained machine learning model.

In some implementations, a method for performing entity resolution between a first dataset and a second dataset using a trained machine learning model includes defining, by a system, a first set of common attributes of the first dataset and a second set of common attributes of the second dataset; generating, by the system, a candidate set of mappings between one or more entities in the first dataset and one or more entities in the second dataset based on candidate generation criteria associated with a related pair of common attributes in the first set of common attributes and the second set of common attributes; generating, by the system, feature sets for the candidate set of mappings based on the first set of common attributes, the second set of common attributes, and a featurization configuration; training or selecting, by the system, a trained machine learning model for performing entity resolution between the first dataset and the second dataset; and performing, by the system, entity resolution between the first dataset and the second dataset based on the feature sets for the candidate set of mappings using the trained machine learning model.

In some implementations, a non-transitory computer-readable medium storing a set of instructions includes one or more instructions that, when executed by one or more processors of a device, cause the device to: define a first set of common attributes of a first dataset and a second set of common attributes of a second dataset; generate a candidate set of mappings between one or more entities in the first dataset and one or more entities in the second dataset based on candidate generation criteria associated with a related pair of common attributes in the first set of common attributes and the second set of common attributes; generate feature sets for the candidate set of mappings based on the first set of common attributes, the second set of common attributes, and a featurization configuration; train or select a trained machine learning model for performing entity resolution between the first dataset and the second dataset based on model configuration information; and perform entity resolution between the first dataset and the second dataset based on the feature sets for the candidate set of mappings using the trained machine learning model.

BRIEF DESCRIPTION OF THE DRAWINGS

FIGS. 1A-1E are diagrams of an example implementation relating to entity resolution using a trained machine learning model.

FIG. 6 is a flowchart of an example process relating to entity resolution using a trained machine learning model.

DETAILED DESCRIPTION

Figure 1B:
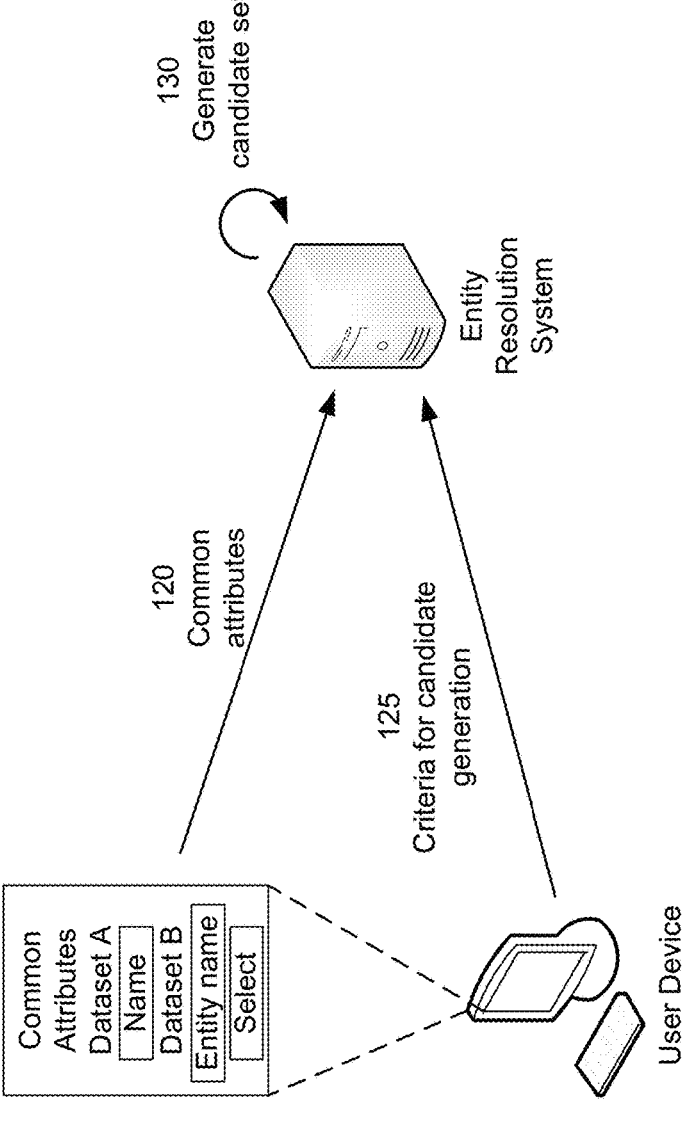

The following detailed description of example implementations refers to the accompanying drawings. The same reference numbers in different drawings may identify the same or similar elements.

Entity resolution typically involves identifying common or related entities in one or more datasets. Machine learning models are often trained to perform entity resolution tasks. In order to perform a particular entity resolution task, a machine learning model that is specific to that particular entity resolution task is typically trained and deployed. Accordingly, a developer typically creates code for training and deploying the machine learning model that is specific to the type of entity resolution task being performed, as well as the datasets and entities on which the entity resolution is being performed. Although similar steps for training a machine learning classifier and/or performing entity resolution may be repeated in different entity resolution tasks, developers typically build and deploy code packages for such steps that are specific to each entity resolution task. Accordingly, training and deploying machine learning resources to perform different entity resolution tasks may require a large amount of time and/or manpower to generate specific code for each entity resolution task. Furthermore, generating and deploying specific code for similar steps in different entity resolution tasks may consume a large amount of memory resources, processing resources, network resources, and/or other computing resources.

Some implementations described herein enable a system to provide a pipeline for automated generation of a trained machine learning model for entity resolution and deployment of the trained machine learning model to perform entity resolution. In some implementations, the system may define a first set of common attributes of a first dataset and a second set of common attributes of a second dataset, and the system may define candidate generation criteria relating to at least one pair of related common attributes from the first set of common attributes and the second set of common attributes. The system may generate a candidate set of mappings between entities in the first dataset and entities in the second dataset based on the candidate generation criteria. The system may determine a featurization configuration for the first set of common attributes and the second set of common attributes, and the system may generate feature sets for the candidate set of mappings based on the first set of common attributes, the second set of common attributes, and the featurization configuration. The system may receive, from a client device, model configuration information, and the system may train a machine learning model to perform entity resolution between the first dataset and the second dataset based on the model configuration information. The system may perform entity resolution between the first dataset and the second dataset based on the feature sets for the candidate set of mappings using the trained machine learning model.

As a result, the system may automate generation of a trained machine learning model that is configured for a particular entity resolution task and deployment of the trained machine learning model to perform the particular entity resolution task. Accordingly, the system may perform customized entity resolution for different entity resolution tasks without a developer building specific code to customize similar entity resolution steps for each entity resolution task. Thus, the time and manpower consumed to generate and deploy trained machine learning models to perform entity resolution tasks may be reduced. Furthermore, the techniques described herein reduce consumption of memory resources, processing resources, network resources, and/or other computing resources associated with building, storing, and deploying specific code to customize similar entity resolution steps for different entity resolution tasks.

FIGS. 1A-1E are diagrams of an example 100 associated with entity resolution using a trained machine learning model. As shown in FIGS. 1A-1E, example 100 includes an entity resolution system, a user device, and a model training system. These devices are described in more detail in connection with FIGS. 4 and 5.

As shown in FIG. 1A, and by reference number 105, the entity resolution system may receive, from the user device, information identifying datasets for which an entity resolution task is to be performed. In example 100, the entity resolution task is to merge a first dataset and a second dataset by combining information associated with common entities (e.g., records corresponding to the same real world entity) in the first and second datasets. In some implementations, the entity resolution task may involve eliminating duplicate copies of repeated data, clustering or grouping records that correspond to the same entity, identifying records that reference the same entity across different datasets, and/or converting data that represents entities with multiple representations into a standard form, among other examples.

The user device may transmit, to the entity resolution system, information identifying the first dataset and the second dataset that are to be merged. For example, the information identifying a dataset may include a name of the dataset, a location of the dataset (e.g., a data structure in which the dataset is stored), a link to the dataset, among other examples. In some implementations, the user device may transmit, to the entity resolution system, the first dataset and/or the second dataset.

As further shown in FIG. 1A, and by reference number 110, the entity resolution system may locate and/or retrieve the first dataset (shown as "Dataset A") and the second dataset (shown as "Dataset B") based on the information identifying the first dataset and the second dataset received from the user device. In some implementations, the first dataset and the second dataset may be stored using different data structures. In some implementations, the first data and the second dataset may include respective groups of data (e.g., records) stored in the same data structure.

Each dataset may include a respective set of records, which correspond to real world entities, such as people (e.g., users, customers, account holders, or social media profiles), businesses, organizations, or locations, among other examples. As used herein, an "entity" of a dataset may refer to a record or entry in the dataset that corresponds to a real world entity. For example, in FIG. 1A, Dataset A includes Entity 1, Entity 2, and Entity 3, and Dataset B includes Entity A, Entity B, and Entity C. Each dataset may include various attributes that are associated with each entity. The attributes may include various pieces of information stored in the record corresponding to each entity in the dataset. The attributes may vary based on each dataset and based on the type of entity. For example, in a case in which the entity is a person, the attributes may include name, address, telephone number, email address, age, date of birth (DOB), gender, an image associated with the entity (e.g., a social media profile picture or identification photograph), among other examples. In a case in which the entity is a business or organization, the attributes may include name, address/location, telephone number, email address, hours, years in business, rating information, an image associated with the entity (e.g., a logo or photograph of a business), among other examples. For example, in FIG. 1A, Dataset A includes attributes of "Name," "Address," "Tel" (telephone number), "Email," "Age," and "Image," and Dataset B includes attributes of "Entity Name," "Location," "Cell" (cell phone number), "Email," "DOB," and "Gender."

As further shown in FIG. 1A, and by reference number 115, the entity resolution system may estimate memory resources for training a machine learning model and/or performing entity resolution based on the first and second datasets. In some implementations, the entity resolution system may determine a size of the first dataset and a size of the second dataset, and estimate memory resources to be used for training the machine learning model to perform entity resolution between the first dataset and the second dataset, and/or memory resources to be used for deploying the trained machine learning model based on the size of the first dataset and the size of the second dataset. For example, the entity resolution system may estimate the memory resources based on the sizes of the datasets using a formula, algorithm, or a trained machine learning memory prediction model that inputs the sizes of the datasets and outputs a prediction of the memory resources. The entity resolution system may reserve the estimated memory resources for training the machine learning model and/or deploying the trained machine learning model. For example, the entity resolution system may reserve, with the model training system, the estimated memory resources for training the machine learning model.

It is difficult for developers to accurately predict the amount of memory resources that will be used to train a machine learning model for entity resolution. This may cause an insufficient amount of memory resources to be reserved, which may result in a delay in training the machine learning model or an inability to train the machine learning model, or may cause too large an amount of memory resources to be reserved, which may result in an inefficient usage of memory resources. By automatically estimating the memory resources based on the sizes of the datasets, the entity resolution system may ensure that sufficient memory resources are reserved, and thereby increase efficiency or memory allocation by the entity resolution system and/or the model training system.

As shown in FIG. 1B, and by reference number 120, the entity resolution system may receive, from the user device, information identifying common attributes of the first dataset and the second dataset. The entity resolution system may determine a first set of common attributes of the first dataset and a second set of common attributes of the second dataset based on the information identifying the common attributes. Common attributes may be attributes that are included in both of the first dataset and the second dataset. Common attributes may have the same name in the first dataset and the second dataset (e.g., "Email" in Dataset A and Dataset B) or may have different names in the first dataset and the second dataset (e.g., "Address" in Dataset A and "Location" in Dataset B). Each attribute included in the first set of common attributes may be associated with a respective attribute in the second set of common attributes.

The entity resolution system may determine a first list of attribute names for the attributes in the first dataset and a second list of attribute names for the attributes in the second dataset. The entity resolution system may transmit, to the user device, the first list of attribute names and the second list of attribute names. In some implementations, the entity resolution system may cause the user device to present a user interface that displays the first list of attribute names and the second list of attribute names. For example, the user interface may display the first list of attribute names and the second list of attribute names in a selected format, and the user interface may prompt a user of the user device to select pairs of common attributes for the first and second lists of attribute names. The user may select pairs of common attributes from the first and second lists of attribute names, for example, using an input component of the user device. The user device may transmit, and the entity resolution system may receive, the selection of common attributes from the first and second lists of attribute names.

In some implementations, the entity resolution system may automatically determine the common attributes of the first and second datasets. For example, the user interface may present, on the user device, an option for automated generation of the common attributes, and the entity resolution system may automatically generate the first set of common attributes and the second set of common attributes based on a user selection of the option. In some implementations, the entity resolution system may automatically determine the common attributes of the first and second datasets using based on the attribute names in the first and second datasets using a trained machine learning attribute selection model. For example, the trained machine learning attribute selection model may be trained (e.g., by the model training system) to predict pairs of common attributes based on input attribute names. In some implementations, the trained machine learning attribute selection model may also input other information, such as a data type associated with each attribute in the first and second datasets.

In some implementations, the entity resolution system may predict the common attributes of the first and second datasets using the trained machine learning attribute selection model, and the entity resolution system may transmit the predicted common attributes to the user device. The entity resolution system may cause the user interface to present the predicted attributes on the user device. The user may then select which of the predicted common attributes to use for the entity resolution task, and the user device may transmit information identifying the selected common attributes to the entity resolution system.

In some implementations, the user device may also transmit, to the entity resolution system, information identifying unshared attributes in the first dataset and the second dataset. An unshared attributes is an attribute that is in one dataset but is not in the other dataset. For example, an shared attribute of Dataset A is the "Image" attribute, and an unshared attribute of Dataset B is the "Gender" attribute. In some implementations, the entity resolution system may use the information identifying the unshared attributes for generating a merged dataset from the first and second datasets.

As further shown in FIG. 1B and reference number 125, the user device may transmit, to the entity resolution system, criteria for candidate generation. The candidate generation criteria may identify at least one common attribute pair (e.g., related common attributes in the first common attribute set and the second attribute set) to be used for generating a candidate set of mappings between the entities in the first dataset and the entities in the second dataset. The candidate generation criteria may also include a criterion for comparing the entities in the first and second datasets based on attributes values of the common attribute pair. In some implementations, the entity resolution system may determine candidate generation criteria options, and the entity resolution system may transmit the candidate generation criteria options to the user device. For a pair of common attributes in the first set of common attributes and the second set of common attributes, the entity resolution system may determine one or more candidate generation criteria options for comparing attribute values from the first and second datasets. In some implementations, the entity resolution system may determine the candidate generation criteria options based on the attribute name associated and/or the attribute data type. For example, the entity resolution system may determine options such as a string similarity metric for the "Name"/"Entity Name" common attribute pair, or a distance metric for the "Address"/"Location common attribute pair. The user interface may present the candidate generation criteria options on the user device, and the user may select the candidate generation criteria from the candidate generation criteria options. The user device may transmit the selection of the candidate generation criteria to the entity resolution system.

As further shown in FIG. 1B, and by reference number 130, the entity resolution system may generate a candidate set from based on the candidate generation criteria. The candidate set is a set of candidate mappings between entities in the first dataset and entities in the second dataset. Each mapping in the candidate mapping set may be a candidate to be evaluated by a trained machine learning model to determine whether the mapping is a mapping between entities in the first and second datasets that are the same (or are related). The entity resolution system generates the candidate set by filtering the set of all mappings between each of the entities in the first dataset and each of the entities in the second dataset based on the candidate generation criteria to remove mappings that are unlikely to be mappings between entities that are the same. For example, based on the candidate generation criteria, the entity resolution system may compare attribute values for a common attribute pair (e.g., name or address) of entities in the first dataset and entities in the second dataset. The entity resolution system may eliminate mappings between entities in the first and second dataset when the comparison of the attribute values (e.g., based on string similarity for the name attribute or distance for the address attribute) does not satisfy a threshold.

Figure 1C:
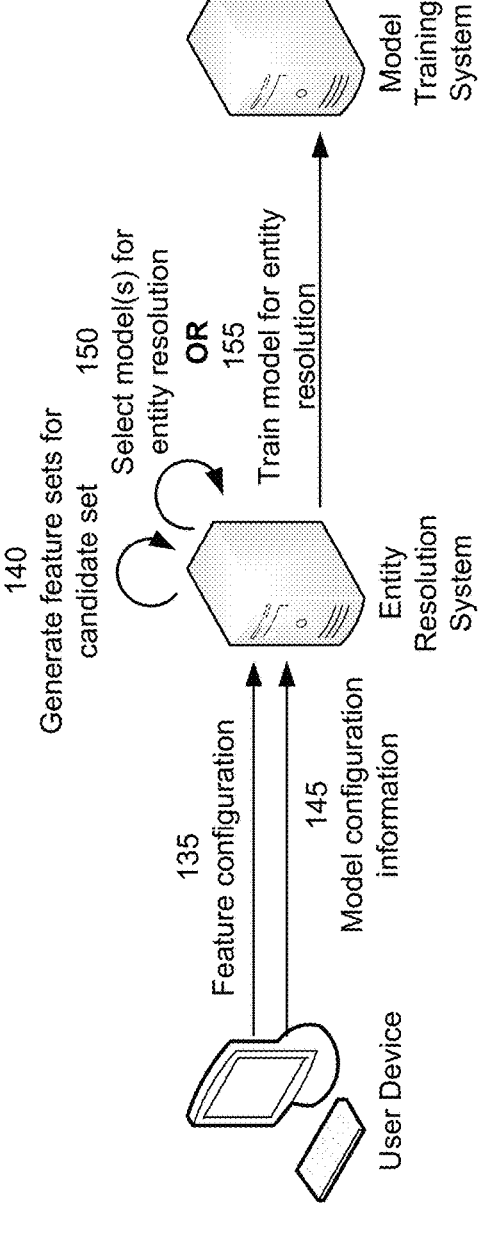

As shown in FIG. 1C, and by reference number 135, the entity resolution system may receive, from the user device, a feature configuration for the common attributes of the first dataset and the second dataset. The feature configuration may indicate how attribute values of the common attributes are represented as features to be input to a machine learning classifier for entity resolution. For example, the feature configuration may indicate features that provide quantifiable representations for the attribute values of the common attributes. In some implementations, the entity resolution system may determine, for each common attribute pair in the first and second sets of common attributes, one or more featurization options based on a type of attribute value associated with that common attribute pair. For example, for common attributes with attribute values that are text strings (e.g., "Name"/"Entity Name"), the featurization options may include one or more string similarity metrics that may be used to calculate a numeric value representing the similarity of the text strings in the first and second datasets. For attribute values that are street addresses, the featurization options may include a distance between the street address locations, and/or one or more string similarity metrics that measure the similarity of the address string. For attribute values that are numeric, the featurization options may include an option for the attribute values to be used as feature values, one or more features calculated based on the attribute values from the first and second datasets, and/or a binary feature (e.g., representing whether or not the attribute values are the same in the first and second datasets), among other examples. For image-based attribute values, the featurization options may include one or more image features extracted from the images in the first and second datasets and/or an image-based similarity measure computed from the image features extracted from the images.

In some implementations, the entity resolution system may transmit, to the user device, the featurization options for each common attribute pair. The entity resolution system may cause the user interface to present the featurization options in a selectable format on the user device. The user device may receive a user selection of a featurization option for each common attribute pair, and the user device may transmit, to the entity resolution system, the featurization configuration including the selected featurization options.

In some implementations, the entity resolution system may determine default featurization options for one or more of the common attribute pairs based on the data type of the attribute values. For example, the user interface on the user device may present an option that allows the user to select a default featurization configuration and/or options that allow the user select default featurization options for individual common attribute pairs. The entity resolution system may determine that the featurization configuration includes the default featurization options for all or a subset of the common attribute pairs based on receiving a user selection of the default options from the user device.

As further shown in FIG. 1C, and by reference number 140, the entity resolution system may generate feature sets for the candidate set of mappings based on the feature configuration. As described above, the candidate set may include candidate mappings between the entities in the first dataset and entities in the second dataset. For each candidate mapping in the candidate set, the entity resolution system may generate a respective feature set representing that candidate mapping. The feature set for a candidate mapping may include features representing the attribute values for common attribute pairs in the first and second sets of common attributes. The entity resolution system may generate the feature values for each feature set based on the featurization options in the featurization configuration, as described above.

As further shown in FIG. 1C, and by reference number 145, the entity resolution system may receive, from the user device, model configuration information. The model configuration information may include information relating to training and/or selecting a machine learning model for the entity resolution task. In some implementations, the model configuration information may include values for one or more hyperparameters relating to a complexity of a machine learning model to be trained. For example, the model configuration information may include one or hyperparameters, such as a learning rate, batch size, and/or parameters indicating a size of and/or topology of a network (e.g., neural network) to be trained, among other examples. Different hyperparameters may be associated with different types of machine learning models. The entity resolution system may transmit, to the user device, various options for the one or more hyperparameters, and the entity resolution system may cause the user interface on the user device to present the options for the hyperparameters for selection by the user.

In some implementations, the model configuration information may include an indication of a type of machine learning model to be trained. In this case, the entity resolution system may transmit, to the user device, information identifying options for the type of machine learning model to be trained, and the entity resolution system may cause the user interface on the user device to present the options for the type of machine learning model for selection by the user. In some implementations, the model configuration information may include a precision threshold that controls the precision with which the machine model classifier performs the entity resolution task. For example, the precision threshold may be a minimum probability score for a candidate mapping between entities in the first and second datasets for which the machine learning model classifies the mapping as positive (e.g., determines that the entities are the same entity).

In some implementations, the model configuration information may include an indication of whether to train the machine learning model for the entity resolution task or use a pre-trained machine learning model for the entity resolution task. For example, the user interface may present, on the user device, selectable options for training the machine learning model or using a pre-trained machine learning model, and the model configuration information may include an indication corresponding to a user selection of training the machine learning model or using a pre-trained machine learning model. In a case in which, the user selects the option to use a pre-trained machine learning model, the user interface may present a choice of multiple pre-trained models that may be used for the machine learning task. For example, the entity resolution system may transmit, to the user device, a list of pre-trained models available on the entity resolution system. In this case, the configuration information may indicate one or more of the pre-trained machine learning models to use for the entity resolution task.

As shown in FIG. 1C, and by reference number 150, in some implementations, the entity resolution system may select a machine learning model for the entity resolution task. For example, the entity resolution system may select a pre-trained machine learning model to use for the entity resolution task based on an indication in the model configuration information. In some implementations, the entity resolution system may select a pre-trained machine learning model to use for the entity resolution task based on a determination that there is no ground truth data (described below) from the first and second datasets available to train a machine learning model. In some implementations, the entity resolution system may select a default pre-trained machine learning model that utilizes a default set of common attributes, such as name, location (e.g., latitude/longitude), and/or telephone number, among other examples).

In some implementations, the entity resolution system may have multiple pre-trained machine learning models available to perform entity resolution tasks. For example, the multiple pre-trained machine learning models may include different types of machine learning models and/or machine learning models that utilize different common attributes, among other examples. In some implementations, the entity resolution system may select a pre-trained machine learning model from the multiple pre-trained machine learning models available based on the attribute names of the common attributes or based on an indication in the model configuration information. In some implementations, the entity resolution system may select more than one pre-trained machine learning model. For example, the entity resolution system may perform the entity resolution task using multiple pre-trained machine learning models and determine the entity resolution results based on the combined outputs of the multiple pre-trained machine learning models. Additionally, or alternatively, the entity resolution system may perform entity resolution on a subset of candidate mappings of the candidate set, and the entity resolution system may transmit, to the user device, the partial entity resolution results from the various pre-trained machine learning models. The user interface on the user device may present the partial entity resolution results from the various pre-trained machine learning models, and the user may select one of the pre-trained machine learning models based on the partial entity resolution results. The entity resolution system may then perform the entity resolution task on the full candidate set using the selected pre-trained machine learning model.

Aa further shown in FIG. 1C, and by reference number 155, in some implementations, the entity resolution system may cause the model training system to train a machine learning model for the entity resolution between the first dataset and the second dataset.

Figure 1D:
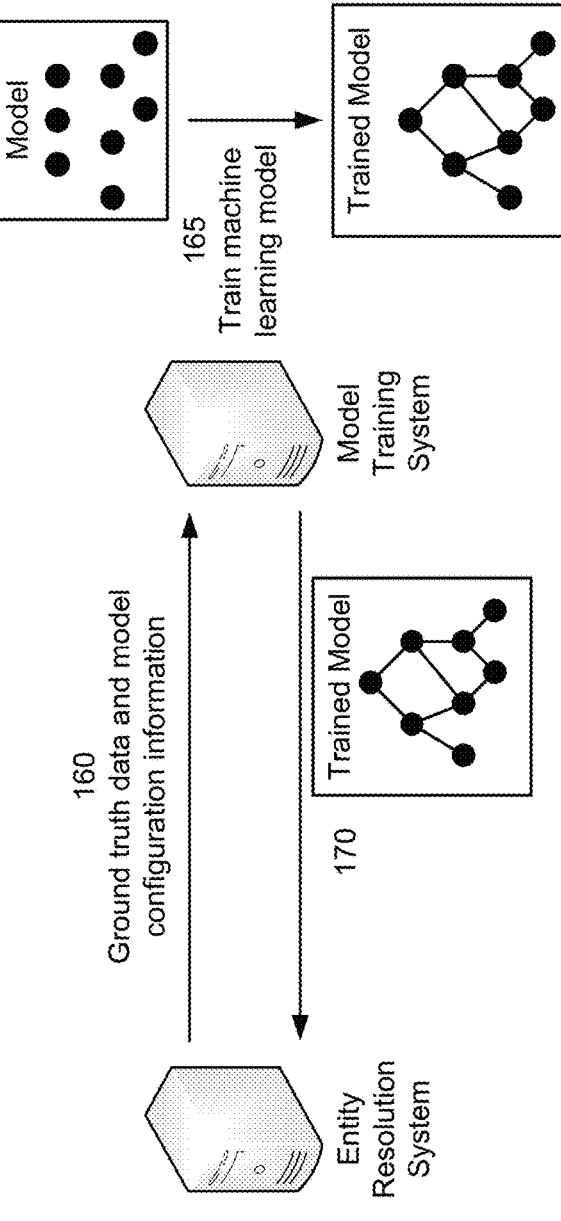

As shown in FIG. 1D, and by reference number 160, the entity resolution system may transmit, to the model training system, the model configuration information and ground truth data associated with entity resolution between the first and second datasets. The ground truth data may include ground truth mappings between a subset of entities in the first dataset and a subset of entities in the second dataset. For example, the ground truth data may include a quantity of positive ground truth mappings (e.g., mappings between entities in the first and second datasets that correspond to the same real world entity) and negative ground truth mappings (e.g., mappings between entities in the first and second datasets that do not correspond to the same real world entity). The entity resolution system may generate feature sets for the ground truth mappings based on the featurization configuration, and the entity resolution system may transmit the feature sets for the ground truth mappings to the model training system.

As further shown in FIG. 1D, and by reference number 165, the model training system may train the machine learning model to perform entity resolution between the first dataset and the second dataset. The model training system may train the machine learning model based on the ground truth data. In some implementations, the model training system may determine one or more hyperparameters of the machine model, the type of machine learning model to be trained, and/or the precision threshold for the machine learning model based on the model configuration information. The machine learning model may be trained using any suitable machine learning algorithm. Examples of training a machine learning model are described in more detail below in connection with FIG. 2.

As part of training of the machine learning model (e.g., during or after model training), the model training system may determine a set of features to be used as input to the trained model for each mapping between entities included in the ground truth training data. In some implementations, the set of features determined during the training may be all or a subset of the set of features extracted for each candidate mapping based on the feature configuration.

As part of training of the machined learning model, the model training system may also generate a model algorithm for the trained machine learning model. The model algorithm may define a manner in which an output score is generated for a candidate mapping from the set of features and from a set of model parameters that are determined during training. For example, the model algorithm may be a mathematical model or function, such as a regression function, that calculates the output score for an observation as a function of the input set of features for the observation and one or more learned model parameters, such as weights and/or biases. Additionally, or alternatively, the model algorithm may be an algorithm that performs a series of operations with learned model parameters on the input set of features. For example, the model algorithm may be a decision tree model, a random forest model, or a neural network, among other examples. In some implementations, the model algorithm may include boosting operations, such as extreme gradient boosting, may include regression operations, such as logistic regression, and/or may include other operations. In some implementations, the output score may be a probability score between 0 and 1 that corresponds to a probability that the candidate mapping is between entities in the first and second datasets that correspond to the same real world entity.

As further shown in FIG. 1D, and reference number 170, the model training system may transmit the trained machine learning model to the entity resolution system. In some implementations, the model training system may transmit, to the entity resolution system, a model file generated as part of training the machine learning algorithm. The model file may identify the model algorithm for the trained machine learning model determined as part of model training. As described above, the model algorithm may include a set of learned model parameters and/or operations performed for calculating a model score from the input features and the learned model parameters. In some implementations, the model file may include a model artifact generated as part of training the machine learning algorithm. The model artifact may be deployable on the entity resolution system to execute the model algorithm for the trained machine learning model on the entity resolution system.

Figure 1E:
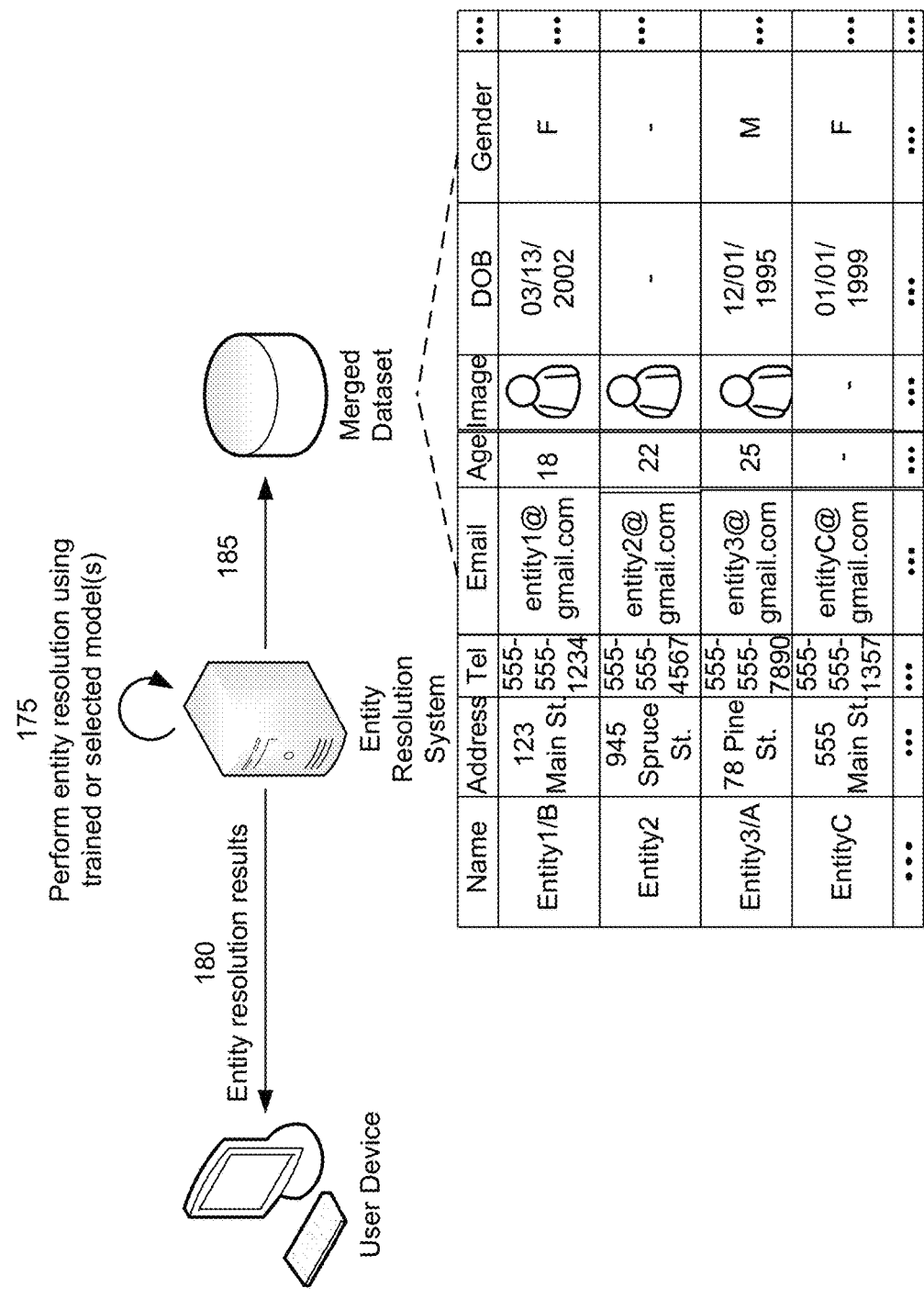

As shown in FIG. 1E, the entity resolution system may perform entity resolution between the first dataset and the second dataset using the trained machine learning model or the selected pre-trained machine learning model. The machine learning model may determine a respective probability score for each candidate mapping in the candidate set. For each candidate mapping, the entity resolution system may input the feature set extracted for the candidate mapping to the machine learning model, and the machine learning model may determine the probability score for the candidate mapping. The entity resolution system may compare the probability score for the candidate mapping to the precision threshold. The entity resolution system may classify the candidate mapping as positive based on the probability score for the candidate mapping satisfying (e.g., being greater than, or greater than or equal to) the precision threshold. The entity resolution system may classify the candidate mapping as negative based on the probability score for the candidate mapping not satisfying (e.g., being less than, or less than or equal to) the precision threshold. The entity resolution system may determine that a candidate mapping is between common or related entities (e.g., entities corresponding to the same real world entity) in the first and second datasets based on the candidate mapping being classified as positive. By eliminating the negatively classified mappings from the candidate set, the entity resolution system may determine a set of resolved mappings between common or related entities in the first and second datasets. In this case, each mapping in the set of resolved mappings may be a mapping between an entity in the first dataset and a corresponding related entity in the second dataset.

As further shown in FIG. 1E, and by reference number 180, the entity resolution system may transmit, to the user device, entity resolution results based on performing entity resolution on the first and second datasets. For example, the entity resolution system may transmit, to the user device, information identifying the set of resolved mappings, and thus identifying the common or related entities in the first and second datasets. The user device may display the entity resolution results, for example on the user interface of the user device.

As further shown in FIG. 1E, and by reference number 185, the entity resolution system may generate and store a merged dataset based on the entity resolution results for the first and second datasets. In the merged dataset, the entity resolution system may combine common entries (e.g., entities corresponding to the same real world entity) from the first and second datasets. For example, as shown in FIG. 1E, "Entity 1" from Dataset A and "Entity B" from Dataset B are combined in the merged dataset, and "Entity 3" from Dataset A and 'Entity B" from Dataset B are combined in the merged dataset. The entity resolution system may select the attribute names and data formats from the first dataset or the second dataset to use for the common attributes in the merged dataset. The entity resolution system may include unshared attributes from the first dataset and/or the second dataset in the merged dataset. For example, the entity resolution system may determine unshared attributes (e.g., "Image" from Dataset A and "Gender" from Dataset B) to include in the merged dataset based on information identifying the unshared attributes received from the user device, as described above.

Although implementations are described herein in connection with performing entity resolution to determine entities in first and second datasets that correspond to the same real world entity, the machine learning entity resolution system described herein may be used to link entities having some target relationship even if the entities do not correspond to the same real world entity. In this case, the machine learning model may be trained, using ground truth mappings between entities having the target relationship, to output a probability score of a mapping being between entities that have the target relationship.

Using the techniques described herein, customized entity resolution for different entity resolution tasks may be performed without a developer building specific code to customize the entity resolution steps for each entity resolution task. Thus, time and manpower consumed to generate and deploy trained machine learning models to perform entity resolution tasks may be reduced. Furthermore, the techniques described herein reduce consumption of memory resources, processing resources, network resources, and/or other computing resources associated with building, storing, and deploying specific code to customize similar entity resolution steps for different entity resolution tasks.

As indicated above, FIGS. 1A-1E are provided as an example. Other examples may differ from what is described with regard to FIGS. 1A-1E.

Figure 2:
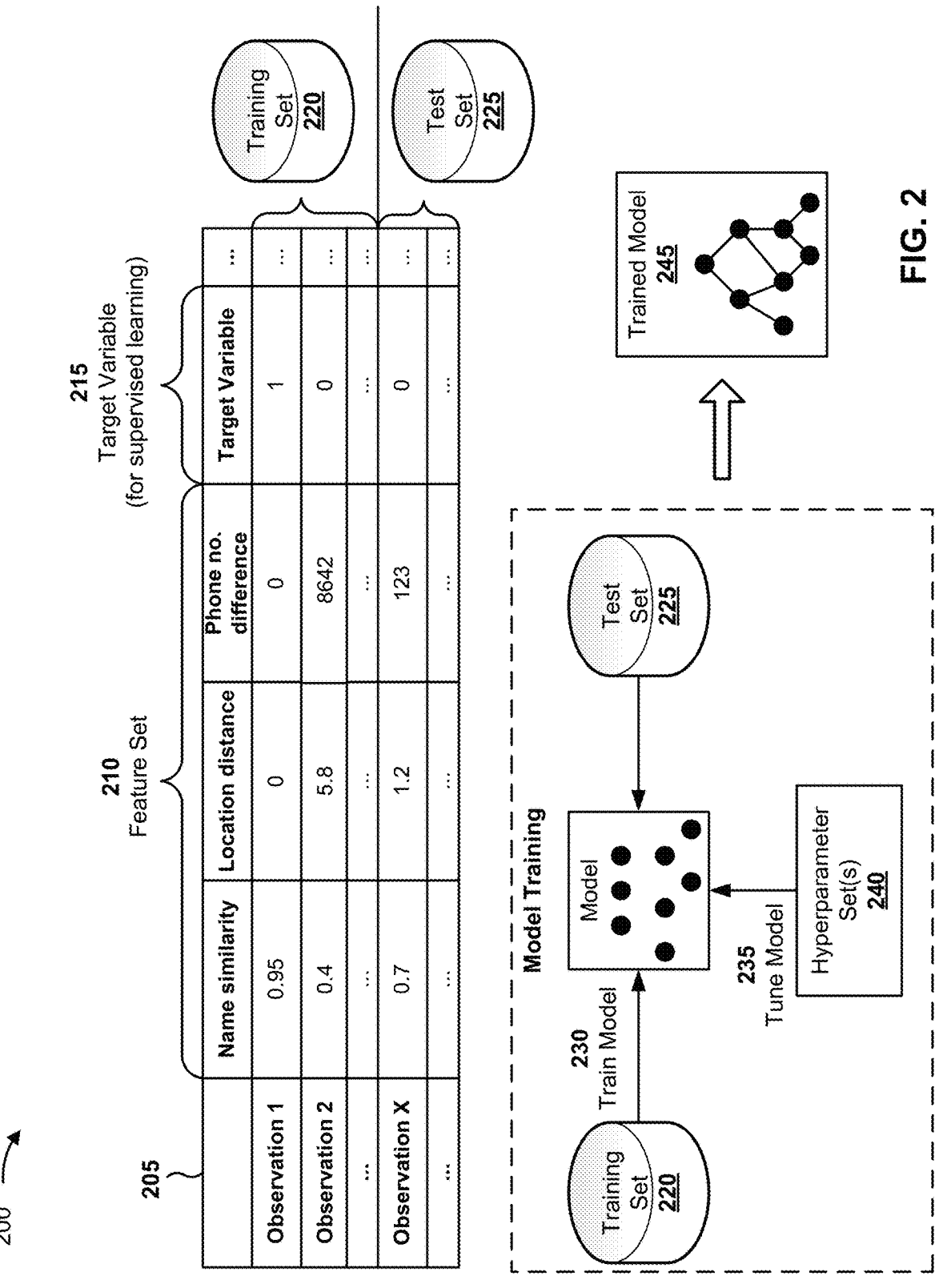
FIG. 2 is a diagram illustrating an example of training a machine learning model in connection with entity resolution.

FIG. 2 is a diagram illustrating an example 200 of training a machine learning model in connection with entity resolution. The machine learning model training described herein may be performed using a machine learning system. The machine learning system may include or may be included in a computing device, a server, a cloud computing environment, or the like, such as entity resolution system 420 and/or model training system 430 described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from the user device and/or the entity resolution system, as described elsewhere herein. In some implementations, the machine learning system may receive the set of observations (e.g., as input) from user device 410 and/or entity resolution system 420.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from user device 410 and/or entity resolution system 420. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of name similarity (e.g., similarity between entity names determined using a string similarity metric), a second feature of location distance (e.g., distance between locations), a third feature of phone number difference (e.g., a difference between telephone numbers for the entities), and so on. As shown, for a first observation (e.g., a first ground truth mapping), the first feature may have a value of 0.95, the second feature may have a value of 0, the third feature may have a value of 0, and so on. These features and feature values are provided as examples and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is a probability score to determine whether a mapping is between common entities in different datasets, which has a value of 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning system may compare the performance scores for each machine learning model and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
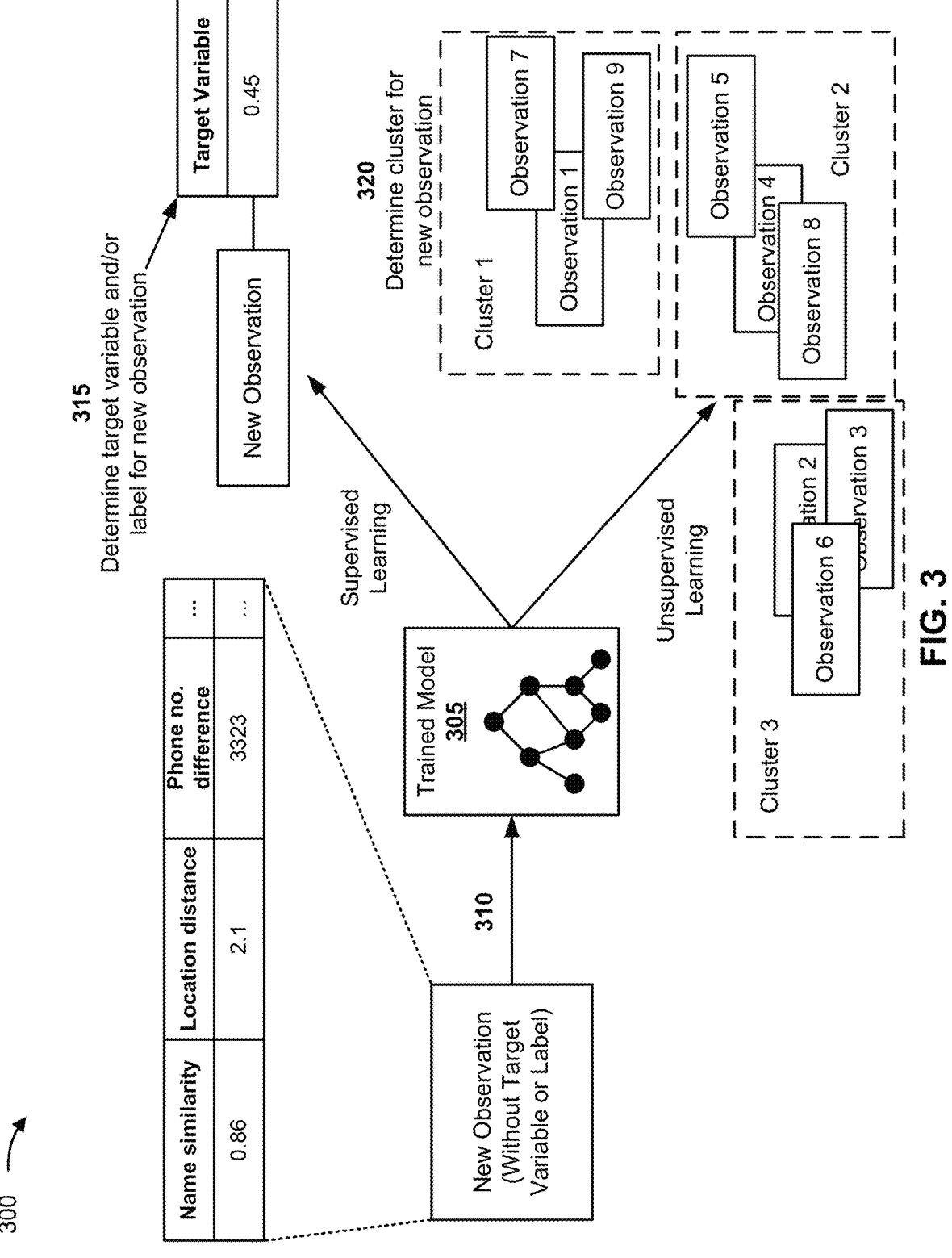
FIG. 3 is a diagram illustrating an example of applying a trained machine learning model to a new observation associated with entity resolution.

FIG. 3 is a diagram illustrating an example 300 of applying a trained machine learning model to a new observation associated with entity resolution. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, or a cloud computing environment, such as entity resolution system 420 and/or model training system 430.

As shown by reference number 310, the machine learning system may receive a new observation (or a set of new observations) and may input the new observation to the machine learning model 305. As shown, the new observation (e.g., a candidate mapping between an entity in a first dataset and an entity in a second dataset) may include a first feature of name similarity, a second feature of location distance, a third feature of phone number distance, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 305 may predict a value of 0.45 for the target variable of an entity resolution probability score for the new observation, as shown by reference number 315. Based on this prediction (e.g., based on the value having a particular label or classification or based on the value satisfying or failing to satisfy a threshold), the machine learning system may provide a recommendation and/or output for determination of a recommendation, such as a determination that the observation (e.g., candidate mapping) is not a mapping between common entities. Additionally, or alternatively, the machine learning system may perform an automated action and/or may cause an automated action to be performed (e.g., by instructing another device to perform the automated action), such as not combining the entities into the same entry in a merged dataset. As another example, if the machine learning system were to predict a value of 0.99 for the target variable of the entity resolution probability value, then the machine learning system may provide a different recommendation and/or may perform or cause performance of a different automated action (e.g., combining the entities into the same entry in a merged dataset). In some implementations, the recommendation and/or the automated action may be based on the target variable value having a particular label (e.g., classification or categorization) and/or may be based on whether the target variable value satisfies one or more thresholds (e.g., whether the target variable value is greater than a threshold, is less than a threshold, is equal to a threshold, or falls within a range of threshold values).

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster (e.g., entities correspond to the same real world entity), then the machine learning system may provide a first recommendation and/or may cause a first automated action to be performed, such as combining the entities into a single entry in a merged dataset. As another example, if the machine learning system were to classify the new observation in a second cluster (e.g., entities are unrelated), then the machine learning system may provide a second (e.g., different) recommendation and/or may perform or cause performance of a second (e.g., different) automated action, such as not combining the entities into the same entry in a merged dataset.

In this way, the machine learning system may apply a rigorous and automated process to entity resolution between entities in a first dataset and entities in a second dataset. The machine learning system enables recognition and/or identification of tens, hundreds, thousands, or millions of features and/or feature values for tens, hundreds, thousands, or millions of observations, thereby increasing accuracy and consistency and reducing delay associated with entity resolution relative to requiring computing resources to be allocated for tens, hundreds, or thousands of operators to manually perform entity resolution using the features or feature values.

As indicated above, FIG. 3 is provided as an example. Other examples may differ from what is described in connection with FIG. 3.

Figure 4:
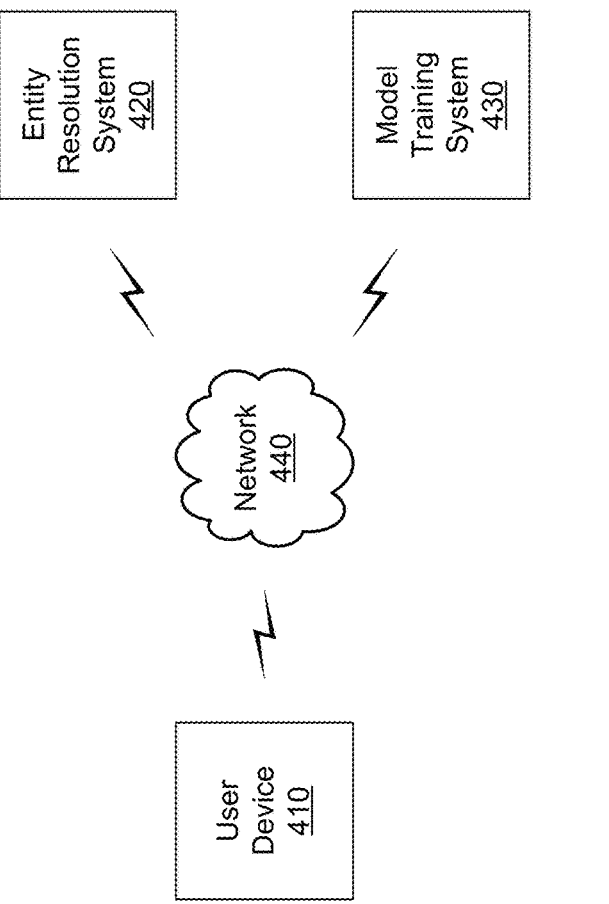
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a user device 410, an entity resolution system 420, a model training system 430, and a network 440. Devices of environment 400 may interconnect via wired connections, wireless connections, or a combination of wired and wireless connections.

The user device 410 includes one or more devices capable of receiving, generating, storing, processing, and/or providing information associated with machine learning model-based entity resolution, as described elsewhere herein. The user device 410 may include a communication device and/or a computing device. For example, the user device 410 may include a wireless communication device, a mobile phone, a user equipment, a laptop computer, a tablet computer, a desktop computer, or a similar type of device.

The entity resolution system 420 includes one or more devices capable of receiving, generating, storing, processing, providing, and/or routing information associated with machine learning model-based entity resolution, as described elsewhere herein. The entity resolution system 420 may include a communication device and/or a computing device. For example, the entity resolution system 420 may include a server, such as an application server, a client server, a web server, a database server, a host server, a proxy server, a virtual server (e.g., executing on computing hardware), or a server in a cloud computing system. In some implementations, the entity resolution system 420 includes computing hardware used in a cloud computing environment.

The model training system 430 includes one or more devices capable of receiving, generating, storing, processing, providing, and/or routing information associated with machine learning model-based entity resolution, as described elsewhere herein. The model training system 430 may include a communication device and/or a computing device. For example, the model training system 430 may include a server, such as an application server, a client server, a web server, a database server, a host server, a proxy server, a virtual server (e.g., executing on computing hardware), or a server in a cloud computing system. In some implementations, the model training system 430 includes computing hardware used in a cloud computing environment.

The network 440 includes one or more wired and/or wireless networks. For example, the network 440 may include a cellular network, a public land mobile network, a local area network, a wide area network, a metropolitan area network, a telephone network, a private network, the Internet, and/or a combination of these or other types of networks. The network 440 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
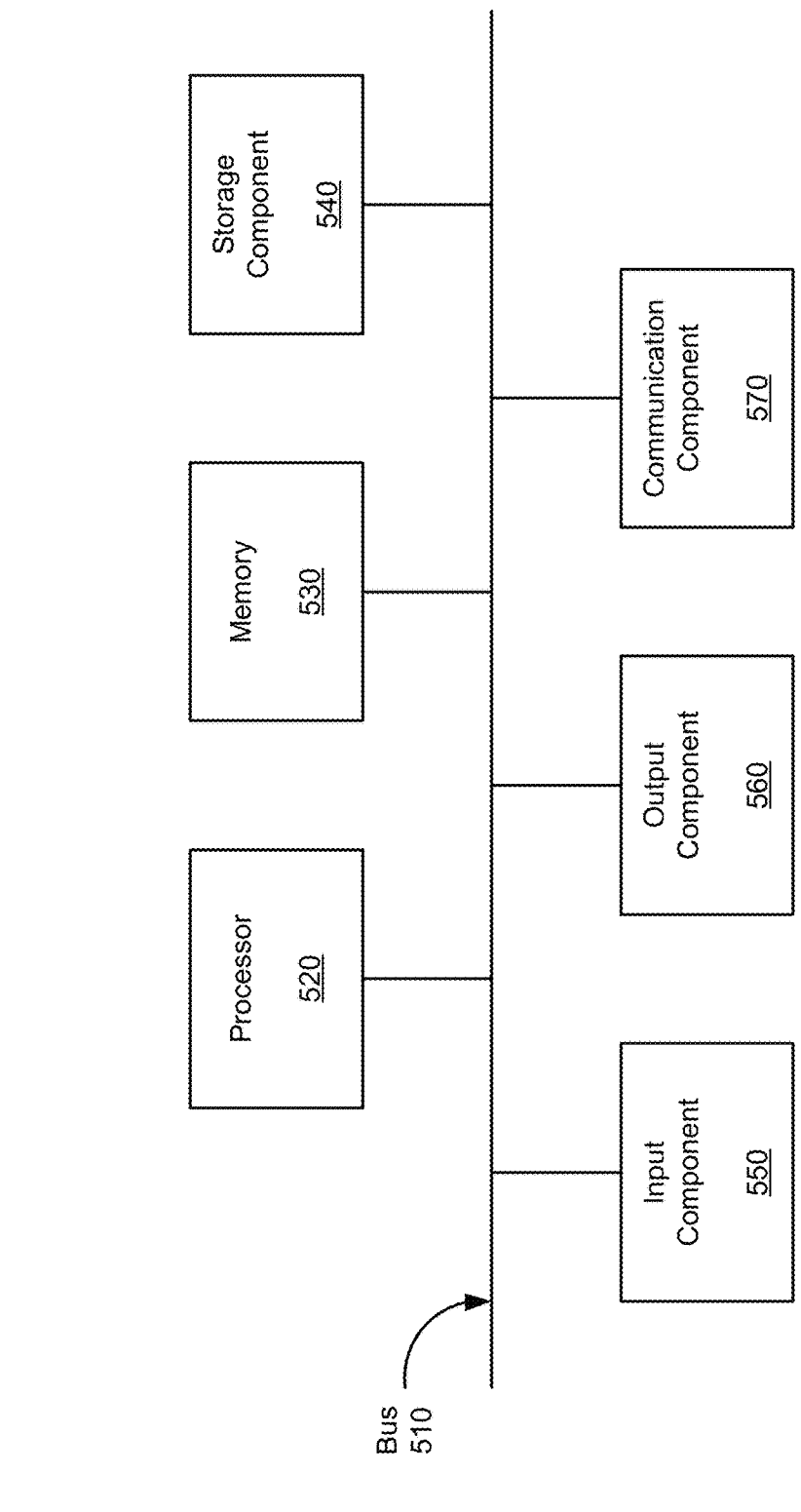
FIG. 5 is a diagram of example components of one or more devices of FIG. 4.

FIG. 5 is a diagram of example components of a device 500, which may correspond to the user device 410, the entity resolution system 420, and/or the model training system 430. In some implementations, the user device 410, the entity resolution system 420, and/or the model training system 430 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flowchart of an example process 600 associated with entity resolution using a trained machine learning model. In some implementations, one or more process blocks of FIG. 6 may be performed by a system (e.g., entity resolution system 420). In some implementations, one or more process blocks of FIG. 6 may be performed by another device or a group of devices separate from or including the system, such as user device 410 and/or model training system 430 Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include defining a first set of common attributes of the first dataset and a second set of common attributes of the second dataset (block 610). As further shown in FIG. 6, process 600 may include generating a candidate set of mappings between one or more entities in the first dataset and one or more entities in the second dataset based on candidate generation criteria associated with a related pair of common attributes in the first set of common attributes and the second set of common attributes (block 620). As further shown in FIG. 6, process 600 may include generating feature sets for the candidate set of mappings based on the first set of common attributes, the second set of common attributes, and a featurization configuration (block 630). As further shown in FIG. 6, process 600 may include training or selecting a trained machine learning model for performing entity resolution between the first dataset and the second dataset (block 640). As further shown in FIG. 6, process 600 may include performing entity resolution between the first dataset and the second dataset based on the feature sets for the candidate set of mappings using the trained machine learning model (block 650).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating a trained machine learning model for performing entity resolution, the system comprising:

one or more memories; and one or more processors, communicatively coupled to the one or more memories, configured to:

receive, from a client device, information identifying a first dataset and a second dataset;

estimate and reserve, based on the first dataset and the second dataset, hardware device memory resources for training a machine learning model, by determining a first size of the first dataset and a second size of the second dataset and utilizing a trained machine learning memory prediction model that inputs the first size and the second size and outputs a prediction of hardware device memory resources usage;

define a first set of common attributes of the first dataset and a second set of common attributes of the second dataset;

identify unshared attributes of the first dataset and the second dataset;

define candidate generation criteria relating to at least one pair of related common attributes from the first set of common attributes and the second set of common attributes;

generate a candidate set of mappings between one or more entities in the first dataset and one or more entities in the second dataset based on the candidate generation criteria;

determine a featurization configuration for the first set of common attributes and the second set of common attributes;

generate feature sets for the candidate set of mappings based on the first set of common attributes, the second set of common attributes, and the featurization configuration and the candidate set;

receive, from the client device, model configuration information;

train, based on the reserved memory resources, the machine learning model for performing entity resolution between the first dataset and the second dataset based on the model configuration information, resulting in the trained machine learning model, wherein training the machine learning model includes a cross-validation procedure that comprises:

splitting a training set into a training group and a hold-out group;

generating a cross-validation score based on testing the machine learning model on the hold-out group after training the machine learning model on the training group and based on not using a test set; and combining generated cross-validation scores of training procedures to generate an overall cross-validation score for the trained machine learning model; and wherein a plurality of trained machine learning models are generated based on performing the cross-validation for a plurality of machine learning algorithms;

perform entity resolution between the first dataset and the second dataset based on the feature sets for the candidate set of mappings using the trained machine learning model, selected from the plurality of trained machine learning models, wherein the selection is based on a highest overall cross-validation score based on selecting the trained machine learning model corresponding to the highest overall cross-validation score;

generate, based on using information identifying the unshared attributes and based on results from performing the entity resolution, a merged dataset from the first dataset and the second dataset, wherein the merged dataset combines common entries from the first dataset and the second dataset and includes the unshared attributes, and wherein the results cause an automated action to be performed that includes combining or not combining entities into a same entry in the merged dataset; and process the merged dataset that includes common entries from the first and second datasets and unshared attributes from the first and the second data sets, wherein the merged dataset is stored for further data processing operations associated with the merged dataset.

2. The system of claim 1, wherein the one or more processors, when defining the first set of common attributes the second set of common attributes, are configured to:

receive, from the client device, information identifying one or more common attributes of the first set of common attributes and one or more common attributes of the second set of common attributes.

3. The system of claim 2, wherein the one or more processors, when receiving the information identifying the one or more common attributes of the first set of common attributes and the one or more common attributes of the second set of common attributes, are further configured to:

determine a first list of attribute names associated with the first dataset and a second list of attribute names associated with the second dataset;

transmit, to the client device the first list of attribute names and the second list of attribute names; and receive, from the client device, a selection of the one or more common attributes of the first set of common attributes from the first list of attribute names and a selection of the one or more common attributes of the second set of common attributes from the second list of attribute names.

4. The system of claim 1, wherein the one or more processors, when defining the first set of common attributes and the second set of common attributes, are configured to:

determine a first list of attribute names associated with the first dataset and a second list of attribute names associated with the second dataset; and generate the first set of common attributes and the second set of common attributes based on the first list of attribute names and the second list of attribute names using a trained machine learning attribute selection model.

5. The system of claim 1, wherein the one or more processors, when defining the candidate generation criteria, are configured to:

transmit, to the client device, one or more candidate generation criteria options for one or more pairs of related common attributes from the first set of common attributes and the second set of common attributes; and receive, from the client device, a selection of the at least one pair of related common attributes from the one or more pairs of related common attributes, and a selection of the candidate generation criteria from the one or more candidate generation criteria options for the at least one pair of related common attributes.

6. The system of claim 1, wherein the one or more processors, when determining the featurization configuration, are configured to:

determine, for each common attribute of the first set of common attributes and the second set of common attributes, one or more featurization options based on a type of attribute value associated with that common attribute;

transmit, to the client device, the one or more featurization options determined for each common attribute of the first set of common attributes and the second set of common attributes; and receive, from the client device, a selection of a featurization option for each common attribute of the first set of common attributes and the second set of common attributes.

7. The system of claim 1, wherein the one or more processors, when generating the trained machine learning model, are configured to:

train the machine learning model based on ground truth mappings for a subset of entities in the first dataset and the second dataset.

8. The system of claim 7, wherein the model configuration information includes a hyperparameter relating to a complexity of the trained machine learning model, and the one or more processors, when training the machine learning model, are configured to:

train the machine learning model with the complexity based on the hyperparameter included in the model configuration information.

9. The system of claim 1, wherein the model configuration information includes an indication of a type of machine learning model, and the one or more processors, when training the machine learning model, are configured to:

train the of type machine learning model indicated in the model configuration information.

10. The system of claim 1, wherein the one or more processors, when training the machine learning model, are configured to:

train multiple types of machine learning models based on ground truth mappings;

test the multiple types of machine learning models; and select the trained machine learning model from the multiple types of machine learning models based on testing the multiple types of machine learning models.

11. The system of claim 1, wherein the model configuration information includes a precision threshold, and the one or more processors, when performing entity resolution between the first dataset and the second dataset, are configured to:

calculate, using the trained machine learning model and the first dataset and the second dataset, a respective probability score for each mapping in the candidate set of mappings; and compare the respective probability score for each mapping in the candidate set of mappings with the precision threshold to determine a set of resolved mappings between related entities in the first dataset and the second dataset.

12. The system of claim 1, wherein the one or more processors, when estimating and reserving the hardware device memory resources, are configured to:

estimate memory resources for generating the trained machine learning model and performing entity resolution between the first dataset and the second dataset using the trained machine learning model based on a size of the first dataset and a size of the second dataset; and reserve the memory resources estimated for generating the trained machine learning model and performing entity resolution.

13. The system of claim 1, wherein the one or more processors are further configured to:

perform cross-validation when training the machine learning model, wherein the cross-validation comprises:

splitting a training set into a number of groups;

marking the number of groups as a hold-out group or a training group; and training the machine learning model on the training group and testing the trained machine learning model based on the hold-out group to generate a cross-validation score; and select the machine learning model from a plurality of machine learning models as the trained machine learning model to be used for subsequent processes.

14. The system of claim 1, wherein the further data processing operations include tasks associated with financial transactions that include operations associated with entity resolution.

15. A method for performing entity resolution between a first dataset and a second dataset using a trained machine learning model, comprising:

estimating and reserving, by a system and based on the first dataset and the second dataset, hardware device memory resources for training a machine learning model, by determining a first size of the first dataset and a second size of the second dataset and utilizing a trained machine learning memory prediction model that inputs the first size and the second size and outputs a prediction of hardware device memory resources usage;

defining, by the system, a first set of common attributes of the first dataset and a second set of common attributes of the second dataset;

identifying, by the system, unshared attributes of the first dataset and the second dataset;

generating, by the system, a candidate set of mappings between one or more entities in the first dataset and one or more entities in the second dataset based on candidate generation criteria associated with a related pair of common attributes in the first set of common attributes and the second set of common attributes;

generating, by the system, feature sets for the candidate set of mappings based on the first set of common attributes, the second set of common attributes, and a featurization configuration;

training or selecting, by the system and based on the reserved memory resources, the trained machine learning model for performing entity resolution between the first dataset and the second dataset, wherein the training includes a cross-validation procedure that comprises:

splitting a training set into a training group and a hold-out group;

generating a cross-validation score based on testing the machine learning model on the hold-out group after training the machine learning model on the training group and based on not using a test set; and combining generated cross-validation scores of training procedures to generate an overall cross-validation score; and wherein a plurality of trained machine learning models are generated based on performing the cross-validation for a plurality of machine learning algorithms;

performing, by the system, entity resolution between the first dataset and the second dataset based on the feature sets for the candidate set of mappings using the trained machine learning model, selected from the plurality of trained machine learning models, wherein the selection is based on a highest overall cross-validation score based on selecting the trained machine learning model corresponding to the highest overall cross-validation score;

generating, by the system and based on using information identifying the unshared attributes and based on results from performing the entity resolution, a merged dataset from the first dataset and the second dataset, wherein the merged dataset combines related entries from the first dataset and the second dataset and includes the unshared attributes, and wherein the results cause an automated action to be performed that includes combining or not combining entities into a same entry in the merged dataset; and processing, by the system, the merged dataset that includes common entries from the first and second datasets and unshared attributes from the first and the second data sets, wherein the merged dataset is stored for further data processing operations.

16. The method of claim 15, wherein generating or selecting the trained machine learning model comprises:

training the machine learning model based on ground truth data associated with a subset of entities of the first dataset and the second dataset, resulting in the trained machine learning model.

17. The method of claim 15, wherein performing entity resolution between the first dataset and the second dataset comprises:

calculating probability scores for the candidate set of mappings using the trained machine learning model and based on the feature sets; and determining a set of resolved mappings from the candidate set of mappings based on the probability scores for the candidate set of mappings, wherein each resolved mapping in the set of resolved mappings is a mapping between related entities in the first dataset and the second dataset.

18. A non-transitory computer-readable medium storing a set of instructions, the set of instructions comprising:

one or more instructions that, when executed by one or more processors of a device, cause the device to:

receive information identifying a first dataset and a second dataset;

estimate and reserve, based on the first dataset and the second dataset, hardware device memory resources for training a machine learning model, by determining a first size of the first dataset and a second size of the second dataset and utilizing a trained machine learning memory prediction model that inputs the first size and the second size and outputs a prediction of hardware device memory resources usage;

define a first set of common attributes of a first dataset and a second set of common attributes of a second dataset;

identify unshared attributes of the first dataset and the second dataset;

generate a candidate set of mappings between one or more entities in the first dataset and one or more entities in the second dataset based on candidate generation criteria associated with a related pair of common attributes in the first set of common attributes and the second set of common attributes;

generate feature sets for the candidate set of mappings based on the first set of common attributes, the second set of common attributes, and a featurization configuration;

train or select, based on the reserved memory resources, a trained machine learning model for performing entity resolution between the first dataset and the second dataset based on model configuration information, wherein the training or selecting include a cross-validation procedure that comprises:

splitting a training set into a training group and a hold-out group;

generating a cross-validation score based on testing the machine learning model on the hold-out group after training the machine learning model on the training group and based on not using a test set; and combining generated cross-validation scores of training procedures to generate an overall cross-validation score for the trained machine learning model; and wherein a plurality of trained machine learning models are generated based on performing the cross-validation for a plurality of machine learning algorithms;

perform entity resolution between the first dataset and the second dataset based on the feature sets for the candidate set of mappings using the trained machine learning model, selected from the plurality of trained machine learning models, wherein the selection is based on a highest overall cross-validation score based on selecting the trained machine learning model corresponding to the highest overall cross-validation score;

generate, based on using information identifying the unshared attributes and based on results from performing the entity resolution, a merged dataset from the first dataset and the second dataset, wherein the merged dataset combines common entries from the first dataset and the second dataset and includes the unshared attributes, and wherein the results cause an automated action to be performed that includes combining or not combining entities into a same entry in the merged dataset; and

process the merged dataset that includes common entries from the first and second datasets and unshared attributes from the first and the second data sets, wherein the merged dataset is stored for further data processing operations associated with the merged dataset.

19. The non-transitory computer-readable medium of claim 18, wherein the one or more instructions, when executed by the one or more processors, further cause the device to:

transmit, to a client device, one or more options for at least one of the first set of common attributes, the second set of common attributes, the candidate generation criteria, the featurization configuration, or the model configuration information; and receive, from the client device, a selection from the one or more options for the at least one of the first set of common attributes, the second set of common attributes, the candidate generation criteria, the featurization configuration, or the model configuration information.

20. The non-transitory computer-readable medium of claim 18, wherein the one or more instructions, that cause the device to train or select the trained machine learning model for performing entity resolution, cause the device to:

transmit, to the model training system, the model configuration information and a set of ground truth data for a subset of entities in the first dataset and the second dataset; and receive, from the model training system, the trained machine learning model, wherein the trained machine learning model is trained based on the ground truth data and at least one of a type of the trained machine learning model, a complexity of the trained machine learning model, or a precision parameter of the trained machine learning model is based on the model configuration information.

* * * * *